United States Patent [19]
Deletzke, Jr.

[11] 3,980,246
[45] Sept. 14, 1976

[54] AUTOMATIC TAPE WINDING SYSTEM

[76] Inventor: Norman E. H. Deletzke, Jr., 849 Fletcher St., Chicago, Ill. 60601

[22] Filed: Feb. 26, 1975

[21] Appl. No.: 553,118

[52] U.S. Cl. .............................. 242/56 R; 242/191
[51] Int. Cl.² .................. B65H 19/20; B65H 59/38
[58] Field of Search .......... 242/186, 188, 191, 195, 242/56 R; 360/71–74

[56] References Cited
UNITED STATES PATENTS

| | | | |
|---|---|---|---|
| 3,134,527 | 5/1964 | Willis | 242/195 |
| 3,195,825 | 7/1965 | Louzil | 242/195 |
| 3,495,782 | 2/1970 | Nelson et al. | 242/56 R |

*Primary Examiner*—Leonard D. Christian
*Attorney, Agent, or Firm*—Jerold A. Jacover

[57] ABSTRACT

An automatic tape winding system having a supply reel and a takeup reel adapted to receive a predetermined quantity of tape from the supply reel is disclosed. A reduced quantity of tape, less than the predetermined quantity is initially selected and inputted into the winding system. Winding is then initiated whereby tape is moved from the supply reel to the takeup reel past means for developing signals corresponding to the speed at which a determined quantity of tape is moved. When the quantity of tape corresponding to the signals developed equals the reduced quantity, the supply reel is automatically decelerated in anticipation of a subsequent signal effecting the stoppage of the supply reel and the takeup reel.

35 Claims, 7 Drawing Figures

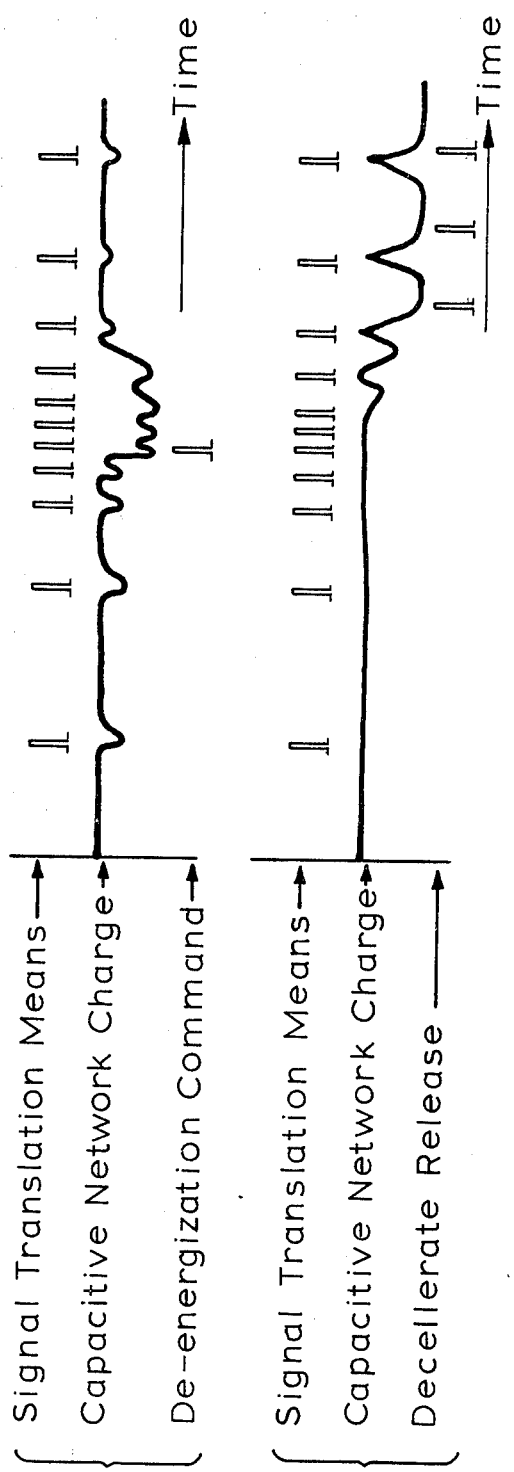
FIG. 5
{ Signal Translation Means
  Capacitive Network Charge
  De-energization Command }
FIG. 6
{ Signal Translation Means
  Capacitive Network Charge
  Decellerate Release }
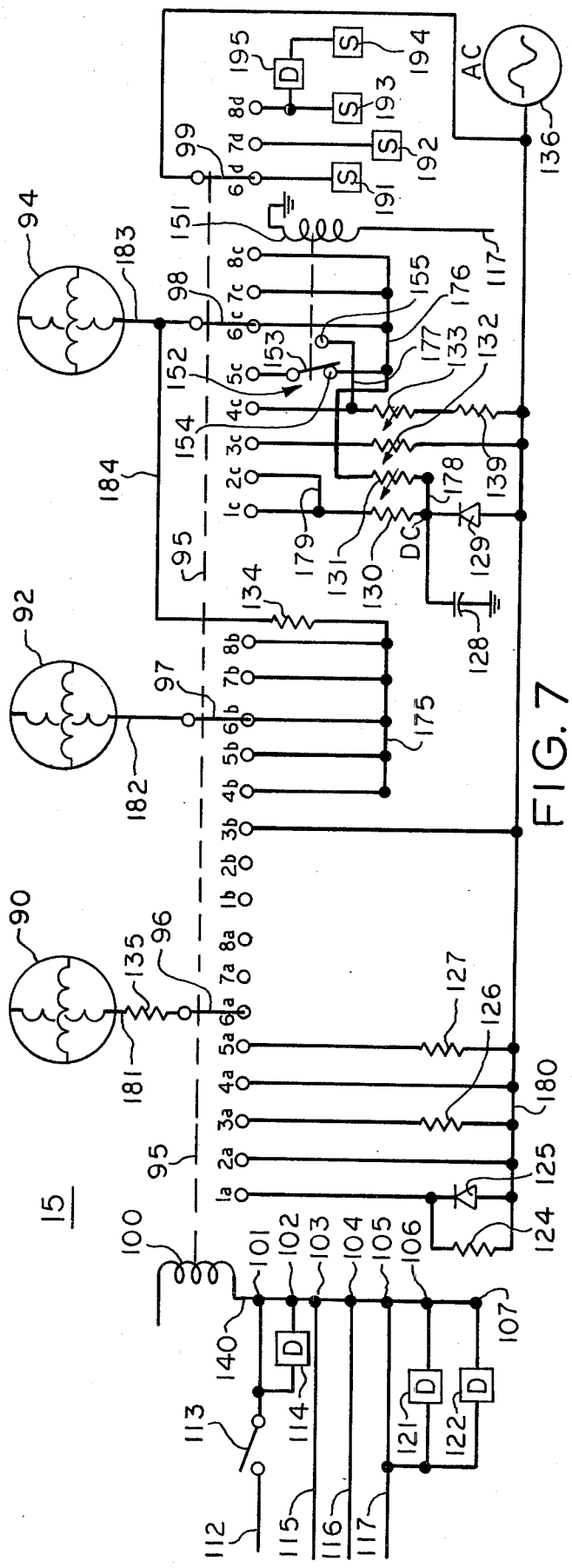
FIG. 7

AUTOMATIC TAPE WINDING SYSTEM

BACKGROUND OF THE INVENTION

This invention generally relates to an improved apparatus and method for winding magnetic tape, of the type used in recording and playback machines, from a supply reel to a takeup reel. The winding system of the invention finds particular use in the manufacture of continuous loop magazines such as 8-track tape cartridges, though other applications also exist. Most particularly, this invention represents an improvement in the tape winding system described in Applicant's copending application, Ser. No. 511,200 filed on Oct. 2, 1974.

In the tape recording industry, particularly that aspect thereof that produces audio programs for consumer entertainment purposes, three familiar tape formats compete vigorously in the marketplace. These formats include the so-called reel-to-reel format, the cassette, and the 8-track cartridge. The reel-to-reel format utilizes a supply reel, on which a tape containing recorded program material is wound. To hear the program material the tape is conventionally fed past a playback head and collected on a takeup reel. After the program has been completed, the tape is ordinarily rewound onto the supply reel.

The cassette is a miniaturized self-contained reel-to-reel system. Like the reel-to-reel format, the cassette has a supply reel and a takeup reel adapted to wind and rewind tape carrying recorded program material. The reels, however, are ordinarily enclosed within a small plastic magazine, which is inserted into a specially adapted machine to achieve the various operative modes such as playback, record and rewind.

Unlike the conventional reel-to-reel format or the cassette, the continuous loop cartridge utilizes only a single reel for carrying tape on which program material is recorded. The tape is wound about the reel in a continuous loop by extracting one end of the tape from the most interior wind and splicing it to the free, outer end. The continuous reel is then conventionally inserted in a plastic magazine, somewhat larger in size than the cassette. A specially designed cartridge player is adapted to play the recorded material upon insertion of the cartridge.

Though the continuously wound 8-track cartridge has numerous advantages over both the reel-to-reel format and the cassette, particularly the fact that it does not have to be rewound after playback, it also suffers from several drawbacks. Among these drawbacks is the fact that the manufacture of 8-track cartridges requires a relatively large amount of labor per unit and has a relatively high reject ratio. This adds to the cost of the cartridges placed on the market, and as a result, the 8-track cartridge has not realized its maximum competitive potential.

Though manufacturing techniques vary, in general, 8-track cartridges are made by starting with a supply reel of tape having a plurality of identical programs recorded thereon. The tape is placed on a winding apparatus and one end is threaded past a capstan and onto an 8-track platform, sometimes referred to hereinafter as a takeup reel. Motors controlling the capstan, the takeup reel, and sometimes the supply reel are then energized, to pull tape from the supply reel to the takeup reel, until the first program is wound onto the takeup reel. After this has been accomplished, the motors are de-energized and the rotation of the reels is stopped.

At a point on the tape beyond the end of the first program slack, the tape is cut to provide a free outer end which, as explained above, is spliced to the interior end wound on the takeup reel to provide sufficient slack. In order to make this splice, the interior end is pulled out from the center of the tape wound on the takeup reel, and attached to the free outer end by conventional means. The takeup reel, now carrying a continuous wound tape program, is then inserted into an 8-track magazine in a well-known manner.

Prior to Applicant's above-identified co-pending application, many winding systems of the prior art undesirably produced uniformly tight winds on the takeup reel. In such systems the inner end of the tape could generally be pulled up from the center only with substantial difficulty. Moreover, oftentimes the tape crinkled when it was pulled, necessitating severance and disposal of the crinkled portion. In his co-pending application, Applicant disclosed a tape winding system which advantageously eliminated tight center winds on the takeup reel.

The advantages are achieved, inter alia, by simultaneously energizing the motors used to drive the takeup and supply reels, causing tape to wind onto the takeup reel at substantially the same rate as the tape is unwound from the supply reel. The energization of the supply reel drive motor is then reduced, thereby allowing tape to be rapidly pulled from the supply reel onto the takeup reel. After an entire program is wound onto the takeup reel, the supply reel and the takeup reel are stopped, making the tape ready for pullout and splicing. Since, at the initial sequence of the winding operation, the tape is wound onto the takeup reel at the same speed it is unwound from the supply reel, minimal tension is placed on the tape, and therefore relatively loose center winds are achieved. As explained above, such loose winds permit pullout with little likelihood of crinkle, thereby preventing tape loss and other manufacturing problems. For a more detailed explanation of the operation and benefits of this tape winding system, reference should be made to the above-described, co-pending application.

Though such a system represents a substantial advance in the art, it is still subject to certain drawbacks and deficiencies. For example, it requires the operator to independently judge when to reduce the energization of the supply reel drive motor, and when to effect the stoppage of both the takeup reel and the supply reel prior to pullout and splicing. Poor operator judgment in such situations could result in spillage, waste or a generally unacceptable product. Moreover, the operator must generally devote his full attention to the winding operation, thereby preventing him from operating more than one winding system simultaneously. As explained in greater detail hereinafter, the automatic tape winding system of the invention obviates these and other prior art difficulties by providing a fully automated system. This eliminates the need for operator judgment in slowing or stopping either the takeup reel or the supply reel, and also frees the operator to perform other tasks even while tape is being wound.

SUMMARY OF THE INVENTION

The improved tape winding system of the invention has supply means driven by supply driving means, takeup means driven by takeup driving means, and tape quantity selection means. A predetermined quantity of tape is automatically wound from the supply reel to the takeup reel by performing the following steps:

a. adjusting the tape quantity selection means for a reduced quantity of tape, less than the predetermined quantity, and for an additional quantity of tape equal to the difference between the predetermined quantity and the reduced quantity;

b. simultaneously accelerating the supply means and the takeup means by energizing the supply drive means and the takeup drive means, causing tape to unwind from the supply means and wind onto the takeup with minimal tension on the tape;

c. reducing the energization of the supply driving means causing tape to be pulled from the supply means onto the takeup means;

d. automatically decelerating the supply means when the reduced quantity of tape is wound onto the takeup means; and e. Automatically stopping the takeup means and the supply means when the additional quantity of tape is wound onto the takeup means.

The method for automatically winding tape summarized above is accomplished in a tape winding apparatus comprising a supply reel, a takeup reel adapted to receive a predetermined quantity of tape from the supply reel, and means for energizing the supply reel and the takeup reel to unwind tape from the supply reel onto the takeup reel. The apparatus further includes means for developing a signal corresponding to the instantaneous quantity of tape wound onto the takeup reel, means for selecting a reduced quantity of tape less than the predetermined quantity, and a comparator, coupled between the singal development means and the selection means, for effecting a deceleration command when the quantity of tape wound onto the takeup reel substantially equals the reduced quantity. The deceleration command causes the supply reel to decelerate after the reduced quantity of tape is wound onto the takeup reel.

BRIEF DESCRIPTION OF THE DRAWINGS

An exemplary embodiment of the invention summarized above can be best understood by reading the following detailed description in conjunction with the accompanying drawings in which:

FIGS. 5 and 6 represent the outputs as a function of time of various circuit elements shown schematically in FIG. 4; and FIG. 7 is a schematic diagram illustrating a portion of the automatic tape winding system of the invention.

DETAILED DESCRIPTION OF AN EXEMPLARY EMBODIMENT

Before describing the exemplary embodiment in detail, a brief overview of the automatic tape winding system would be helpful. As explained above, the system is preferably used to wind successive tape programs of predetermined length from supply means, such as a supply reel, onto takeup means, such as a takeup reel. After the program material has been wound onto the takeup reel, the tape is severed, and the interior end of the tape is pulled out from the center of the takeup reel. This end is then spliced to the severed end to form a continuous loop. The takeup reel, with the continuous loop of recorded program material wound thereon, is then inserted into a magazine to complete the manufacture of an 8-track cartridge.

Initially, it is desirable to operate the system so that there is minimal tension on the tape as it is wound from the supply reel to the takeup reel. This achieves relatively loose center winds on the takeup reel to facilitate pullout prior to splicing and insertion into the magazine. Once these relatively loose center winds have been achieved, however, it is desirable to rapidly wind the ramainder of the recorded program material onto the takeup reel. It is, of course, essential that neither too little nor too much tape be wound onto the takeup reel, lest the completed 8-track cartridge contain less than an entire program, or part of a succeeding program. In either case the completed cartridge would have minimal, if any, commerical value.

To insure that only a predetermined quantity of tape corresponding to the precise length of the recorded program is wound onto the takeup reel, the tape winding system is provided with means for decelerating the supply and takeup reels after a first selected quantity of tape, less than the predetermined quantity, has been wound onto the takeup reel. By inputting this first selected quantity into the system, the end of the program is automatically anticipated, thereby readying the system for stoppage when the entire program has been wound.

Stoppage is achieved by selecting a second quantity, preferably equal to the difference between the predetermined program length and the first selected quantity. By inputting this second quantity into the system, the supply and takeup reels can be quickly brought to a stop when one entire program has been wound. If, however, during the anticipatory mode, the supply and takeup reels are decelerated below a predetermined speed, the decelerating force is removed to hasten winding of the quantity of tape.

As explained above, once the entire program has been wound onto the takeup reel, the supply and takeup reels are automatically stopped. Thereafter, the tape is automatically cut and the takeup reel is automatically ejected from the winding apparatus. Thus, the only manual operations required to complete manufacture of the 8-track cartridges are pullout, splicing and insertion into the magazine.

Figure 1:
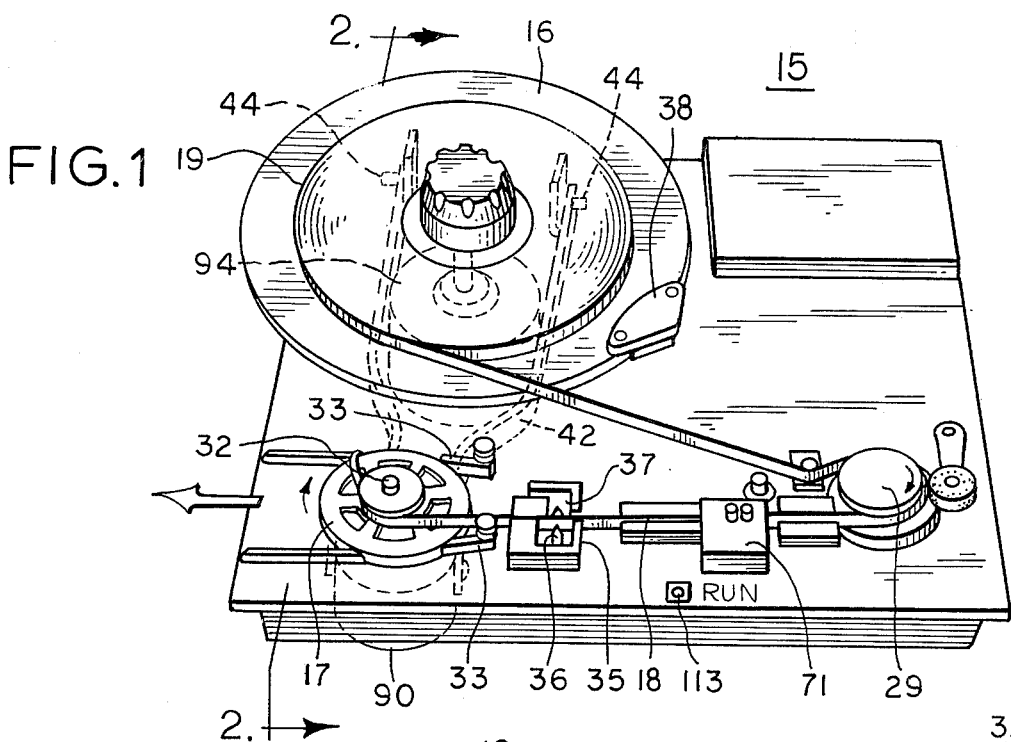
FIG. 1 is a perspective view, partially cutaway, of the automatic tape winding system of the invention.
Figure 2:
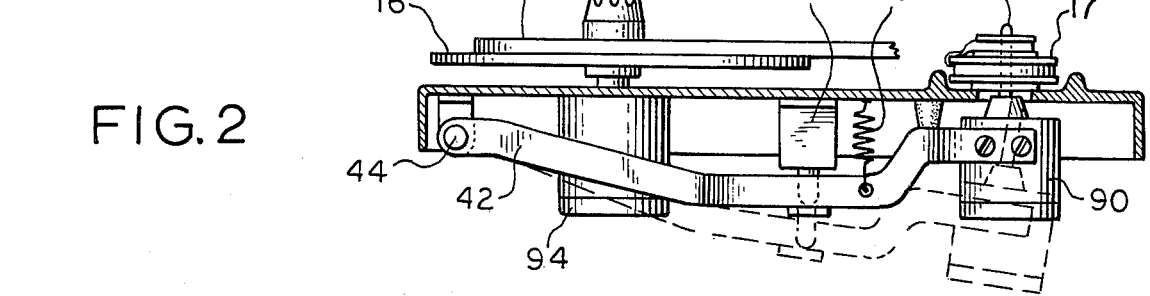
FIG. 2 is a sectional view of the automatic tape winding system taken along lines 2—2 of FIG. 1.

A more specific understanding of the operation of the exemplary embodiment described above can be obtained by referring to the accompanying drawings. More particularly, FIGS. 1 and 2 show a tape winding apparatus designated generally by reference numeral 15. Apparatus 15 includes supply means in the form of a supply reel 16 having a quantity of magnetic tape 19 wound thereon. The tape wound onto supply reel 16 typically comprises a plurality of successive programs of predetermined length. Tape 19 is prepared for automatic winding by guiding it around a rotatable disc 29, through a guide 18, past cutting means 35, and onto takeup means in the form of a takeup reel 17. As shown in FIG. 1, guide 18 defines an elongated channel having a width only slightly wider than the thickness of the tape passing therethrough. In this manner, the tape can be passed from disc 29 to cutting means 35 in edgewise relationship to facilitate cutting and subsequent rethreading after the predetermined lenght of tape has been wound onto takeup reel 17.

As explained in connection with FIG. 7, supply reel 16 is driven by means such as a supply drive motor 94, and takeup reel 17 is driven by means such as takeup drive motor 90. To facilitate stoppage of supply reel 16 and takeup reel 17, a mechanical brake 38 is provided in facing relationship with supply reel 16. Brake 38 is actuated by a solenoid 191 described in connection with FIG. 7. Solenoid 191 operates at the conclusion of the winding sequence to cause brake 38 to apply a frictional force to the rim of supply reel 16.

After the predetermined quantity of tape is wound onto takeup reel 17, and the rotation of reels 16 and 17 are stopped, cutting means 35 are actuated by a solenoid 192 shown in FIG. 7. Cutting means 35 comprise a cutting blade 36 and a mating block 37. Upon actuation by solenoid 192, blade 36 forces the tape against block 37, thereby severing the tape at the desired length.

Takeup reel 17 is located by a spindle 32 extending upwardly from the takeup drive motor 90. Spindle 32 has a plurality of splines (not shown), which are adapted to engage corresponding grooves (not shown) in takeup reel 17 to hold the takeup reel in place, and effect the rotation thereof upon energization of takeup drive motor 90. Motor 90 is secured to one end of a relatively long, spring-biased bracket 42 which is pivotably supported at the other end by a pair of pins 44. After an entire program is wound onto takeup reel 17, and the tape is cut by cutting means 35, a solenoid 193 described in connection with FIG. 7 is actuated, causing bracket 42 to pivot downwardly about pins 44. This, in turn, causes motor 90 to move downwardly, thereby effecting the disengagement of spindle 32 from takeup reel 17. Because of the relatively long length of bracket 42, the arc defined by the downward movement of motor 90, and hence spindle 32, has a relatively large radius. Accordingly, spindle 32 will pass without interference through the center aperture of takeup reel 17 when motor 90 is lowered. After spindle 32 is disengaged from takeup reel 17, a pair of spring-biased kicker feet 33 are actuated to eject takeup reel 17 from apparatus 15. Kicker feet 33 are actuated by a solenoid 194 shown in FIG. 7.

Figure 3:
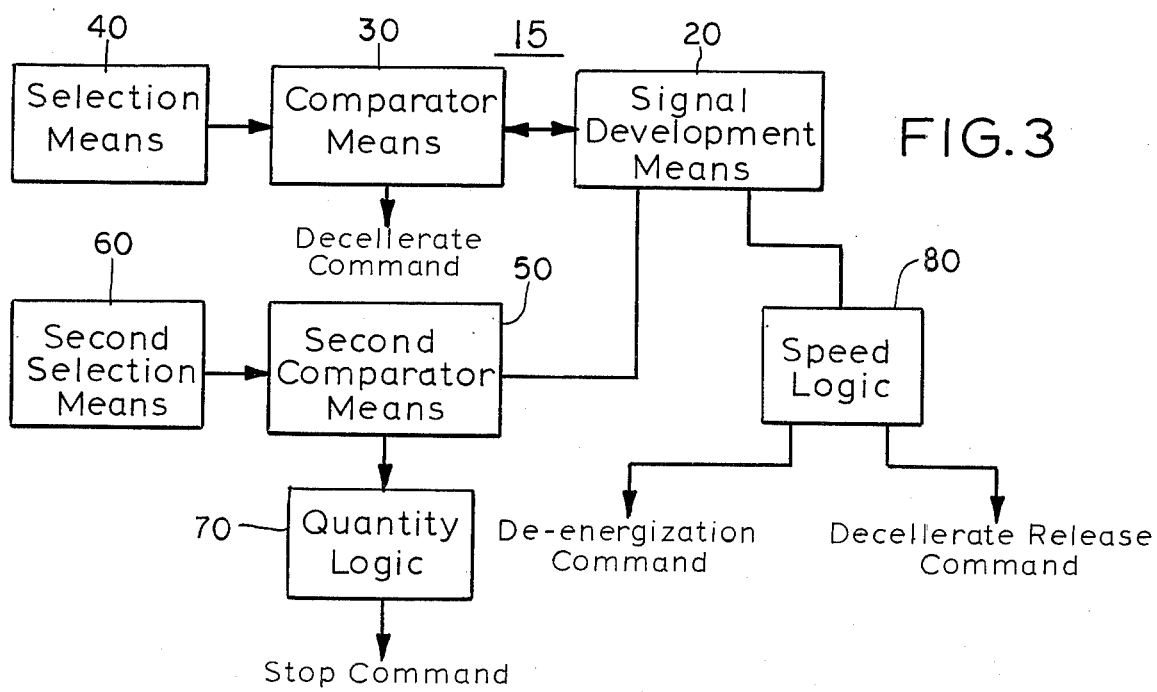
FIG. 3 is a simplified block diagram embodying various aspects of the tape winding system of the invention.

Referring now to FIG. 3, a block diagram of the tape winding apparatus 15 is shown. More particularly, apparatus 15 includes a block 20 designated as Signal Development Means. Block 20 is explained in greater detail hereinafter, but for the present, suffice it to say that the Signal Development Means serve to develop signals, the frequency of which are indicative of the speed at which tape is wound onto the takeup reel. In this sense block 20 performs the function of a tachometer. Since the speed information can be used to determine the corresponding length or quantity of tape wound onto the takeup reel, the Signal Development Means also serves the function of instantaneously indicating such quantity information.

In this exemplary embodiment, the speed information is derived from the frequency of a train of voltage pulses generated in block 20. These pulses are passed to a block 80 designated as Speed Logic which produces a De-energization Command and a Decelerate Release Command whose functions are explained hereinafter. The instantaneous quantity information is in the form of an electronic counter output which is passed to a block 30 designated as Comparator Means.

The Comparator Means also receive an electronic output from a block 40 designated as Selection Means. The output of the Selection Means corresponds to a selected quantity of tape, less than the predetermined length of the program to be wound from the supply reel to the takeup reel. Though the Selection Means can take many forms, including an electronic memory, in this exemplary embodiment it is comprised of a plurality of thumbwheel switches which are adjusted to the selected quantity by the operator. Since this selected quantity is ordinarily less than the length of the program material, it is sometimes referred to herein as a reduced quantity.

When the instantaneous quantity information passed to the Comparator Means from block 20 equals the selected or reduced quantity information passed from block 40, the Comparator Means of block 30 produce a Decelerate Command. As explained in greater detail hereinafter, the Decelerate Command effects the deceleration of the supply and takeup reels, whereby tape winding apparatus 15 assumes its anticipartory mode. The supply reel and the takeup reel can then be readily stopped when the end of the program is detected.

Detection can be accomplished in several ways. For example, a special signal or cue tone can be placed at the end of each program initially wound onto the supply reel. This cue tone can be used to actuate circuitry embodied in block 70, which is designated as Quantity Logic, to effect the generation of a Stop Command. The Stop Command, in turn, causes the supply and takeup reels to cease rotating, thereby preventing any additional tape from winding onto the takeup reel.

The Stop Command can also be effected by alternative means. More particularly, Second Selection means represented by block 60 can be provided to enable the operator to select a second or additional quantity of tape, preferably equal to the difference between the predetermined length of the program and the first selected quantity. An electrical output corresponding to this second selected quantity is then passed to the Second Comparator Means embodied in block 50. The electrical output indicative of the instantaneous quantity of tape wound on the takeup reel is also passed to the Second Comparator Means. When this output corresponds to the output from block 60, block 50 actuates circuitry in the Quantity Logic of block 70 to produce the Stop Command.

Figure 4:
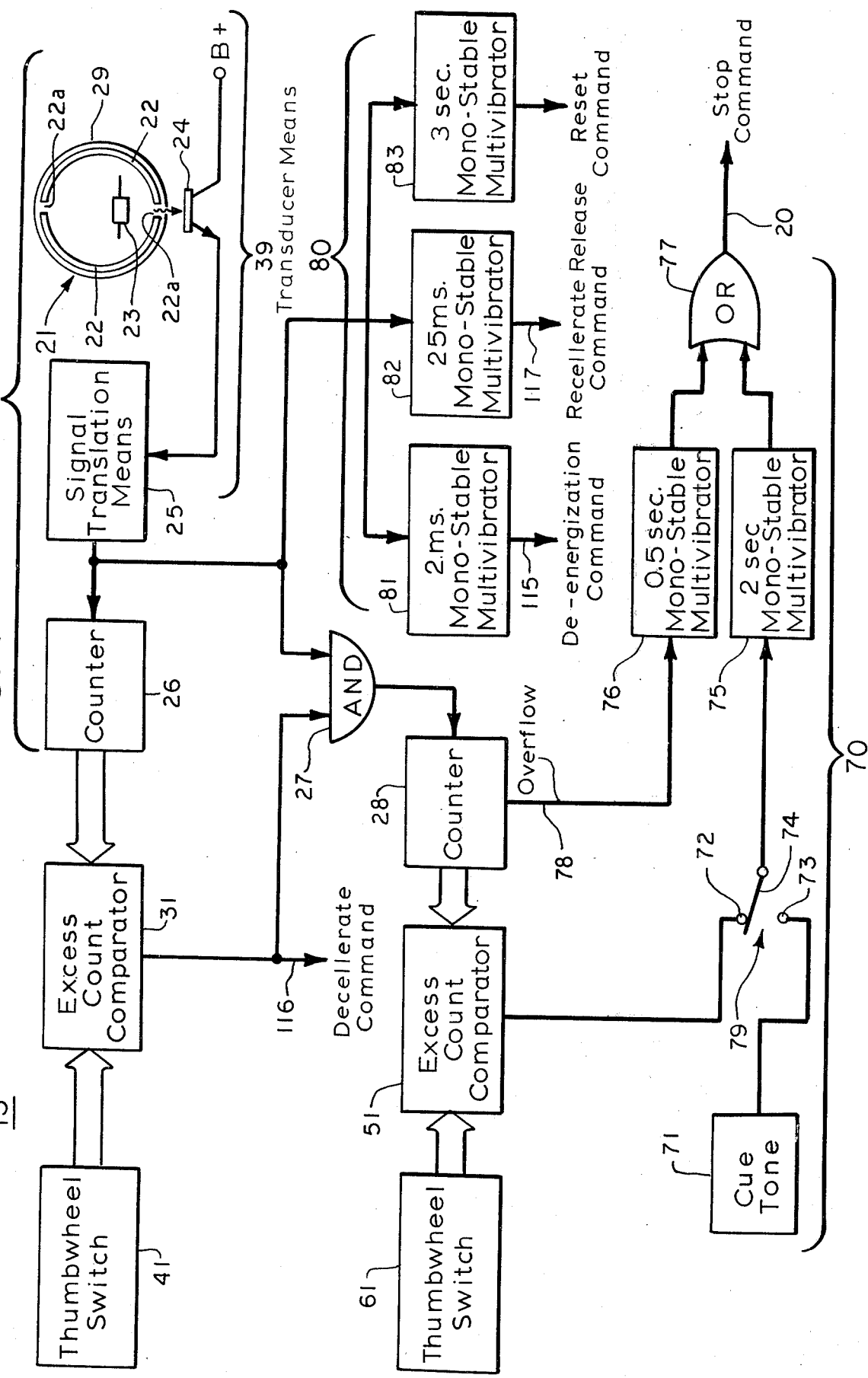
FIG. 4 is a more detailed block diagram of the automatic tape winding system shown in FIG. 1.

Referring now to FIG. 4, the Signal Development Means designated as block 20 in FIG. 3 are shown to include a tachometer 21 comprising disc 29, normally rotated by tape moving between the supply reel and the takeup reel, and sometimes by a tachometer drive motor 92 shown in schematic form in FIG. 7. Disposed inside disc 29 are illumination means in the form of a light emitting diode 23. Diode 23 is charged by conventional means (not shown) to produce light emanating from inside disc 29. Disposed inside disc 29, near the periphery thereof, are a pair of arcuate shields 22 defining a pair of diametrical apertures 22a. Shields 22 serve to block the light from diode 23 at all points about the perimeter of disc 29 except at apertures 22a. Accordingly, only two bursts of light information pass outside of disc 29 with each revolution thereof.

Optically aligned with diode 23 is the base of a normally nonconducting phototransistor 24. Phototransistor 24 has a colletor coupled to a source of B+ voltage, and an emitter coupled to signal translation means 25. When each burst of light information strikes the base of phototransistor 24, the phototransistor is rendered conductive and electrical information is passed to Translation Means 25. In a manner well known in the art, Translation Means 25 shapes the electrical information passed from phototransistor 24 to produce a train of sharply defined voltage pulses. Accordingly, two voltage pulses emanate from Translation Means 25 for each revolution of disc 29. The frequency of occurrence of the voltage pulses thus increases with the rate at which disc 29 rotates.

Since the rate of rotation of disc 29 is dependent upon the speed at which tape is passed from the supply reel to the takeup reel, the frequency of the voltage pulses produced by Translation Means 25 is indicative of the speed of the tape. Moreover, since the circumference of disc 29 is a known, constant value, the number of pulses produced by Translation Means 25 is indicative of the length or quantity of tape wound from the supply reel and onto the takeup reel. For example, if the circumference of disc 29 is 12 inches, each pulse represents one-half that length, or 6 inches of tape wound onto the takeup reel. Thus, the voltage pulses produced by Translation Means 25 provides information relating to both the speed and the quantity of tape wound onto the takeup reel. Since the tachometer 21 and Translation Means 25 serve to convert the movement of the tape into useful electrical information, that combination performs the function of a transducer designated by reference numeral 39. It should be noted, however, that the transducer represented by reference numeral 39 need not be limited to the exemplary combination of tachometer 21 and Translation Means 25 shown in FIG. 4, but can include any suitable means for converting the movement of tape from the supply reel into the information represented by the voltage pulses emanating from Translation Means 25.

The voltage pulses emanating from transducer 39, and more particularly from Translation Means 25 are simultaneously passed to an electronic Counter 26, one input of an AND gate 27, and the Speed Logic represented by block 80 of FIG. 2. Counter 26 counts the number of voltage pulses received, and displays this number in electronic form at an output which is coupled to an Excess Count Comparator 31. Also coupled to Comparator 31 is the electronic representation of the reduced quantity selected by the operator by proper adjustment of a plurality of thumbwheel switches 41. It will be recalled that this reduced quantity is typically less than the length of the program to be wound onto the takeup reel, and therefore represents the time at which the winding system should enter its anticipatory mode.

When the instantaneous quantity of tape counted by Counter 26 equals or exceeds the reduced quantity selected on thumbwheel switches 41, Comparator 31 produces a Decelerate Command which appears at an output conductor 116. The Decelerate Command is also passed to the other input of AND gate 27, which has an output connected to a second electronic Counter 28. Upon coincidence of the Decelerate Command and a voltage pulse from Translation Means 25, AND gate 27 will become operative, and therefore pass a voltage pulse to Counter 28. It should thus be clear that the count electronically represented by Counter 28 will correspond to the quantity of tape wound onto the takeup reel subsequent to the generation of the Deceleration Command. The electronic representation of this count is passed to a second Excess Count Comparator 51 which also receives an electronic output from a plurality of Thumbwheel Switches 61. Thumbwheel Switches 61 are, of course, set by the operator to electronically represent an additional quantity of tape corresponding to the difference between the predetermined program length and the reduced quantity set by Thumbwheel Switches 41. Thus, when an additional quantity of tape corresponding to the quantity set by Thumbwheel Switches 61 is wound onto the takeup reel, the end of the program has been reached and the supply and takeup reels must be stopped.

Like Comparator 31, Comparator 51 produces a signal when the input from Counter 28 equals or exceeds the input from Thumbwheel Switches 61. This signal is passed to one terminal 72 of a toggle switch 79. Toggle switch 79 has a wiper 74 which, when in contact with terminal 72, causes the signal to be passed successively through a 2 second Monostable Multivibrator 75, and one terminal of an OR gate 77, to a conductor 120. The signal appearing on conductor 120 is the Stop Command which is used to effect stoppage of the supply reel and the takeup reel at the end of the program.

As mentioned above, stoppage can also be effectuated through means of a cue tone, which actuates cue tone circuitry 71. Thus, if wiper 74 of Toggle Switch 70 is alternatively in contact with terminal 73, which is coupled to cue tone circuitry 71, a signal generated thereby in response to receipt of the cue tone will be passed through Monostable Multivibrator 75 and OR gate 77 to conductor 120.

Counter 28 is further provided with an overflow output 78 connected to a 0.5 Second Monostable Multivibrator 76. An overflow signal appears at overflow output 78 when Counter 28 reaches a predetermined value, indicative of the fact that a quantity of tape, perhaps in excess of the length of the program, is about to be wound onto the takeup reel. This may occur if the system fails to recognize a cue tone, or Thumbwheel Switches 61 have been improperly set. In either case, the overflow signal passes through Multivibrator 76 and the other terminal of OR gate 77 to conductor 120 where it is used as a Stop Command to effect stoppage of the supply and takeup reels.

As mentioned above, the voltage pulses produced by Translation Means 25 are also passed to the Speed Logic represented by block 80 in FIG. 3. FIG. 4 indicates that this Speed Logic in this exemplary embodiment comprises a 2 millisecond Monostable Multivibrator 81, a 25 millisecond Monostable Multivibrator 82 and a 3 second Monostable Multivibrator 83. Multivibrators 81, 82 and 83 are all connected to Translation Means 25 so as to receive the voltage pulses emanating therefrom. Of course, different parameters for the various multivibrators described may necessarily be required when tapes and reels differing from the conventional 8-track cartridges are used. Accordingly, the parameters set forth herein are only exemplary and should not be construed as limitative.

The function of Monostable Multivibrator 81 is to produce a De-energization Command when the tape moving from the supply reel to the takeup reel exceeds a predetermined speed. As mentioned above, the frequency of the voltage pulses produced by Translation Means 25 corresponds to the speed of the tape. Thus, Multivibrator 81 is adapted to produce the De-energization Command when the pulses from Translation Means 25 surpass a predetermined frequency. Multivibrators of the type represented by reference numeral 81 are conventionally known as retriggerable monostable multivibrators, and therefore no detailed sketch thereof is needed. Suffice it to say, however, that they are comprised of a normally conducting first transistor coupled through a charged capacitive network, characterized by a predetermined discharge delay, which holds a second transistor in a conductive state. When the first transistor is conductive, it causes the capacitive network to be charged. However, as each voltage pulse is received at the first transistor, that transistor is momentarily cut off, thereby causing the capacitive network to discharge. As the frequency of the pulses increases, the first transistor is cut off for an increasingly longer period of time, thereby preventing the capacitive network from recharging. When this occurs, the capacitive network becomes unable to hold the second transistor in its conductive state. Accordingly, the second transistor is cut off, thus effecting the De-energization Command.

The manner in which Multivibrator 81 effects the De-energization Command is illustrated in FIG. 5, where a typical train of voltage pulses produced by Translation Means 25 is represented as a function of time. More particularly, as the frequency of the voltage pulses increases, i.e., as the voltage pulses get closer together, the charge of the capacitive network of Multivibrator 81 decreases to the point where it can no longer hold the second transistor conductive. When this occurs, a De-energization Command is produced. As shown in FIG. 4, the De-energization Command appears at a conductor 115 at the output of Multivibrator 81.

Multivibrator 82 functions in a similar manner as Multivibrator 81, though the first transistor is normally cut off, and driven to its conductive state upon receipt of a pulse from Translation Means 25. When conductive, the first transistor causes the capacitive network to be charged, thereby maintaining the second transistor conductive. As the speed of the tape, and hence the frequency of voltage pulses from Translation Means 25, decreases, the first transistor becomes cut off for a period of time which exceeds the ability of the capacitive network to maintain a charge, thereby cutting off the second transistor. This operation is illustrated generally by the time response shown in FIG. 6.

Referring now to FIG. 7, the operation of the automatic tape winding system can be explained in greater detail. FIG. 7 schematically illustrates takeup drive motor 90, supply drive motor 94, and tachometer drive motor 92. Takeup drive motor 90 is energized by current applied via a conductor 181. Conductor 181 is coupled through a resistor 135 to a wiper 96. Similarly, tachometer drive motor 92 is energized by current applied to a conductor 182, and supply drive motor 94 is energized by current applied to a conductor 183. Conductors 182 and 183 are connected to a wiper 97 and a wiper 98, respectively.

Wipers 96, 97 and 98, along with a solenoid control wiper 99, are sequentially stepped by any suitable means, such as a mechanical stepping switch 95. More particularly, switch 95 steps wiper 96 through a plurality of contacts 1a–8a, wiper 97 through a plurality of contacts 1b–8b, wiper 98 through a plurality of contacts 1c–8c, and wiper 99 through a plurality of contacts 6d–8Since wipers 96, 97, 98 and 99 are all mechanically coupled to switch 95, they move in tandem. Thus, when wiper 96 is moved from contact 1a to 2a, for example, wiper 97 is moved from contact 1b to 2b and wiper 98 is moved from contact 1c to 2c. Wiper 99 is also moved during this time but, as shown in FIG. 6, it has no contacts corresponding to the first five contacts engageable by wipers 96, 97 and 98. However, when wipers 96–98 are moved from contacts 6a to 7a, 6b to 7b and 6c to 7c, respectively, wiper 99 is moved from contact 6d to 7d. For exemplary purposes only, wipers 96–99 are shown to be engaged with contacts 6a–6d, respectively.

Contact 1a is coupled through a diode 125, having a current limiting resistor 124 in parallel therewith, to a buss 180 which is connected to an AC supply 136. Contacts 2a and 4a are connected directly to buss 180, while contacts 3a and 5a are connected to buss 180 via a current limiting resistor 126 and a current limiting resistor 127, respectively. Contacts 6a, 7a and 8a are unconnected.

Still referring to FIG. 7, contacts 1b and 2b are unconnected, contact 3b is directly coupled to A.C. supply 136, and contacts 4b–8b are connected to a buss 175 which is connected via a resistor 134 to conductor 183 associated with supply motor 94.

Contacts 1c and 2c are directly connected to a buss 179 which is coupled through a resistor 130 to another buss 178. Buss 178 is connected to a grounded capacitor 128, and is also coupled through a diode 129 to A.C. supply 136. Diode 129 and capacitor 128 thus function as a rectifier to convert the A.C. from supply 136 to D.C. Contacts 6c, 7c and 8c are connected to a buss 176 which is, in turn, coupled through a variable resistor 131 to buss 178. Contact 3c is connected through a variable resistor 132 to A.C. supply 136, and contact 4c is connected to a buss 177. Contact 4c is also coupled through a variable resistor 133 and a series resistor 139 to A.C. supply 136. Buss 177 is connected to one terminal 155 of a relay contact assembly 152, having a wiper 153 extending from contact 5c. The other terminal 154 of assembly switch 152 is connected to a buss 176. Wiper 153 of assembly switch 152 is normally in contact with terminal 154. However, upon energization of a relay coil 151 coupled between ground and conductor 117 which emanates from the output of Multivibrator 82 in FIG. 4, wiper 153 engages terminal 155. Upon de-energization of relay 151, wiper 153 is returned to engagement with terminal 154.

Contacts 6d, 7d and 8d are connected to a plurality of solenoids 191, 192 and 193, respectively. Contact 8d is also coupled through a delay circuit 195 to another solenoid 194. Wiper 99, which is adapted to sequentially step through contacts 6d–8d, is connected to A.C. supply 136.

Stepping switch 95 is energized by any suitable means such as a coil 100. Thus, when each of a succession of signals is applied to coil 100, switch 95 will simultaneously move wipers 96–99 to the next successive contact. As shown in FIG. 7, coil 100 is connected to a conductor 140 having a plurality of terminals 101–107. In a manner explained immediately below, the signals applied through coil 100 for energizing switch 95 are sequentially produced at terminals 101–107.

Terminal 101 is connected through a momentary RUN switch 113 to a conductor 112 which is, in turn, connected to a D.C. supply (not shown). Thus, when RUN switch 113 is closed, a voltage signal is passed through terminal 101 to coil 100 thereby energizing stepping switch 95. A conventional delay circuit 114 is connected between terminals 101 and 102, thereby causing a voltage signal to appear at terminal 102 a predetermined time after the signal produced by the momentary closing of RUN switch 113 appears at terminal 101. Terminal 103 is connected to conductor 115 which, it will be recalled, is connected to Multivibrator 81 for passing the De-energization Command therefrom. Similarly, terminal 104 is connected to conductor 116 which passes the Decelerate Command from Excess Count Comparator 31.

Terminal 105 is connected to conductor 120 which, it will be recalled, extends from the output of OR gate 77 to pass the Stop Command. Connected between terminal 105 and terminal 106 is a delay circuit 121 which causes a signal to appear at terminal 106 a predetermined time after the Stop Command is presented at terminal 105. Similarly, a delay circuit 122 is coupled between terminals 105 and 107 to cause a signal to be passed to terminal 107 a predetermined time after a signal has appeared at terminal 106.

The operating sequence of tape winder 15 begins when wipers 96, 97 and 98 are at contacts 1a, 1b and 1c, respectively, and wiper 99 is not connected to any of contacts 6d–8d. In this first operating mode, current from A.C. supply 136, limited by resistor 124, is passed through contact 1a, wiper 96, and resistor 135 to conductor 181, thereby slightly energizing takeup motor 90. This causes spindle 32 (FIG. 1) to rotate relatively slowly. The operator then holds the takeup reel over the spindle and waits until the splines thereof are rotated into alignment with corresponding grooves in the takeup reel. When this occurs, the takeup reel is simply dropped into engagement with the spindle.

During this first mode of operation, the tachometer motor 92 is de-energized since wiper 97 is in contact with unconnected contact 1b. The supply motor, however, is supplied with D.C. which is passed through resistor 130, contact 1c and wiper 98 to conductor 183. This D.C. functions as an electrical brake on supply motor 94 to prevent the rotation thereof. Tape from the supply reel can thus be wound around tachometer 21, through tape guide 18 and cutting means 35, and onto the takeup reel with a loose initial turn.

When this is completed the operator acutates RUN switch 113, causing a D.C. signal to be passed through terminal 101 and coil 100 to energize stepping switch 95. Switch 95 responds by moving wipers 96, 97 and 98 to contacts 2a, 2b and 2c, respectively, thereby automatically adjusting the tape winding system to its second mode of operation. In this mode, A.C. current is passed directly from A.C. supply 136 through contact 2a and wiper 96 to conductor 181, thereby energizing takeup motor 90. Ordinarily, this would cause the takeup reel to accelerate, though this does not yet occur since supply motor 94 is still in its electrically braked condition, thereby retarding the rotation of the takeup reel. As a result, the takeup reel can rotate only enough to remove the slack in the initial loose wind, thereby cinching it onto the takeup reel. When this is done, the takeup reel is made ready to accept tape from the supply reel without spillage.

In the second mode of operation tachometer motor 92 remains unenergized since wiper 97 is in contact with unconnected contact 2b. Further, as noted above, supply motor 94 remains electrically braked since contact 2c is connected by buss 179 to contact 1c.

After a short delay determined by delay circuit 114, a momentary D.C. voltage is applied through terminal 102 to coil 100, thereby energizing switch 95. Accordingly, switch 95 causes wipers 96, 97 and 98 to engage contacts 3a, 3b and 3c, respectively, thus moving the tape winding system into its third operational mode. In this mode, current is passed from A.C. supply 136, through current limiting resistor 126, contact 3a and wiper 96 to energize takeup motor 90. Since, as explained below, the electrical brake is now removed from supply motor 94, takeup motor 90 is now free to acelerate, and therefore tape begins to unwind from the supply reel and onto the takeup reel.

Current is also passed from A.C. supply 136 through contact 3b and wiper 97 to tachometer motor 92. As a result, disc 29 of tachometer 21 accelerates, and voltage pulses begin to emanate from Translation Means 25 in a manner explained in detail hereinbefore. At the same time, D.C. is removed from supply motor 94, thereby releasing the electrical brake previously applied thereto. More particularly, in the third operational mode of the tape winding system, current is passed from A.C. supply 136 through variable resistor 132, contact 3c and wiper 98 to conductor 183. This energizes the supply motor 94, causing the supply reel to accelerate at substantially the same rate as the takeup reel. As a result, the supply reel begins unwinding tape at the same rate that the takeup reel is winding tape, thereby placing minimal tension on the tape during the initial winding period. The initial winds on the takeup reel are thus relatively loose to facilitate pullout after the entire winding sequence is completed.

As explained in connection with FIG. 4, the frequency of the voltage pulses emanating from Translation Means 25 is indicative of the speed of the tape as it moves from the supply reel to the takeup reel. When this speed exceeds a predetermined rate, the De-energization Command appears at conductor 115. This De-energization Command is therefore passed to terminal 103, causing switch 95 to be energized by coil 100. When this occurs, switch 95 moves wipers 96, 97 and 98 into engagement with contacts 4a, 4b and 4c, respectively, causing the winding system to enter its fourth mode of operation. In this mode of operation, current is directly applied to contact 4a by A.C. supply 136, and passed to conductor 181 via wiper 96. This current brings takeup motor 90 up to its full operating torque. The current applied to supply motor 94, however, is limited by resistor 139 and variable resistor 133, thereby reducing the energization of the supply motor. Some of this current is also bled through conductor 184, resistor 134 and buss 175 to contact 4b, where it is applied to the tachometer motor via wiper 97.

The resistors 139, 133 and 134 are chosen so that just enough current is supplied to supply motor 194 and tachometer motor 92 to overcome the frictional and inertial forces needed to rotate the supply reel and disc 29, respectively. Thus, in the fourth mode of operation, the takeup reel, driven by takeup motor 90, pulls tape from the supply reel and around disc 29 at an increasingly rapid rate, while supply motor 94 and tachometer motor 92 are substantially free-wheeling.

The tape continues to wind onto the takeup reel at this relatively rapid rate until the winding system enters its fifth or anticipatory mode. As explained hereinbefore, it is during this mode of operation that the winding system automatically decelerates in anticipation of reaching the end of the program intended to be wound onto the takeup reel. This mode is commenced by the generation of the Decelerate Command from the Excess Count Comparator 31.

The Decelerate Command is passed via conductor 116 and terminal 104 to coil 100 which energizes stepping switch 95. Stepping switch 95 responds by moving wipers 96, 97 and 98 to contacts 5a, 5b and 5c, respectively. Since current limiting resistor 127 is connected between contact 5a and A.C. supply 136, a reduced current is passed to conductor 181 via wiper 96, thus causing takeup motor 90 to operate under reduced torque. Simultaneously, electrical braking is applied to supply motor 94 through the application of D.C. via buss 178, variable resistor 131, terminal 154, wiper 152, contact 5c and wiper 98. As a result, supply motor 94 begins to decelerate coincident with the reduced torque of the takeup motor 90. Similarly, a small D.C. current is bled from wiper 98 to contact 5b via conductor 184, resistor 134 and buss 175 to apply electrical braking to tachometer motor 92.

Under ordinary circumstances, the supply reel and the takeup reel will continue to decelerate in anticipation of the Stop Command. However, as explained hereinbefore, circumstances may arise where the Stop Command is tardy. Under these circumstances, the electrical braking may be removed and the supply and takeup reels will no longer be decelerated. This occurs when the Decelerate Relase Command is generated by Multivibrator 82, and passed through conductor 117 to relay 151. Upon energization of relay 151 by the Decelerate Release Command, wiper 153 engages terminal 155 of toggle switch 152, causing A.C. to be applied to contact 5c, and hence supply motor 94, via buss 177 and resistors 133 and 139. Accordingly, electrical braking is removed from supply motor 94, and the supply reel is no longer decelerated by the application of D.C. However, when the Decelerate Release Command is removed, relay 151 is de-energized, and wiper 153 of relay contact assembly 152 returns to terminal 154. The periodic generation and removal of the Decelerate Release Command thus causes the intermittent electrical braking of supply motor 94 in anticipation of the Stop Command.

When this Stop Command is finally generated, and passed via conductor 120 and terminal 105 to coil 100, switch 95 is re-energized, causing wipers 96, 97, 98 and 99 to engage contacts 6a, 6b, 6c and 6d, respectively. When this occurs, takeup motor 90 is de-energized due to the absence of any current being passed from contact 6a. At the same time, electrical braking is applied to supply motor 94 by the passage of D.C. through buss 178, resistor 131 and buss 176 to contact 6c. A small amount of DC is also bled from contact 6c, via conductor 184 and resistor 134, to contact 6b to apply electrical braking to tachometer drive motor 92. Simultaneously, A.C. is passed from A.C. supply 136, through wiper 99 and contact 6d to solenoid 191 which, as explained hereinbefore, is used to actuate mechanical brake 38 (FIG. 1). The removal of AC from supply motor 90, the application of D.C. to motors 92 and 94, and the actuation of mechanical brake 38 thus cause the supply and takeup reels to stop rotating.

After a suitable delay, determined by delay circuit 121, a voltage is passed through terminal 106 to coil 100, causing switch 95 to be energized again. As a result, wipers 96, 97, 98 and 99 are moved to contacts 7a, 7b, 7c and 7d, respectively. It is apparent from FIG. 7 that this movement of wipers 96, 97 and 98 has no effect on motors 90, 92 and 94, respectively, since they remain in the same condition they were when wipers 96–98 were engaged with corresponding contacts 6a, 6b and 6c. The movement of wiper 99 to contact 7d, however, effects the release of mechanical brake 38, which is no longer necessary, and causes A.C. to pass from supply 136 to solenoid 192. As explained in connection with the description of FIGS. 1 and 2, solenoid 192 actuates cutting means 35, causing blade 36 to move toward mating block 37, thereby severing the tape.

After another suitable delay, determined by delay circuit 122, a voltage is passed through terminal 107 to coil 100. This energizes stepping switch 95 once again, whereby wipers 96, 97, 98 and 99 are moved into engagement with contacts 8a, 8b, 8c and 8d, respectively. For the same reasons previously explained, this causes no change in the electrical condition of motors 90, 92 and 94. It does, however, deenergize solenoid 192, and cause AC to be passed from supply 136 through wiper 99 and contact 8d to solenoid 193. As explained in connection with the description of FIGS. 1 and 2, the passage of A.C. to solenoid 193 causes bracket 42 to pivot about pins 44. As a result, takeup motor 90 is lowered, and spindle 32 becomes disengaged from the center aperture of the takeup reel. A short time later, determined by delay circuit 195, solenoid 194 is energized, thereby actuating kicker feet 33. As hereinbefore explained, kicker feet 33 eject the takeup reel, with the completed program material wound thereon. The wipers 96–99 of stepping switch 95 are then typically returned to their initial positions by any suitable means such as the generation of a Reset Command at the output of Multivibrator 83 (FIG. 4). The entire operating sequence of the automatic tape winding system is then ready to wind another program onto another takeup reel.

The embodiment herein described represents one preferred representation of the invention. Many other representations, which do not part from the true scope of the invention, but which contain various refinements, improvements and modifications, will be apparent to those skilled in the art. All such representations are intended to be covered by the appended claims.

I claim:

1. In a tape winding system having supply means driven by supply driving means, takeyp means driven by takeup driving means, and tape quantity selection means, a method for automatically winding a predetermined quantity of tape from said supply means to said takeup means, comprising the following steps:
    a. adjusting said tape quantity selection means for a reduced quantity of tape, less than said predetermined quantity, and for an additional quantity of tape equal to the difference between said predetermned quantity and said reduced quantity;
    b. simultaneously accelerating said supply means and said takeup means by energizing said supply driving means and said takeup driving means, causing tape to unwind from said supply means and wind onto said takeup means with minimal tension on said tape;
    c. reducing the energization of said supply driving means causing said tape to be pulled from said supply means onto said takeup means;

d. decelerating said supply means when the selected quantity of tape is wound onto said takeup means; and e. stopping said takeup means and said supply means when said additional quantity of tape is wound onto said makeup means.

2. The method defined in claim 1 further includes the step of:

f. cutting the tape after said additional quantity of tape is wound onto said takeup means.

3. The method defined in claim 2 further includes the step of:

f. ejecting said takeup means, after said tape has been cut.

4. The method defined in claim 1 further includes the steps of intermittently decelerating said supply means prior to said additional quantity of tape being wound onto said takeup means.

5. In a tape winding system having supply means driven by supply driving means, takeup means driven by takeup driving means, and tape quantity selection means, a method for automatically winding a predetermined quantity of tape from said supply means to said takeup means, comprising the following steps:

a. adjusting said tape quantity selection means for a reduced quantity of tape, less than said predetermined quantity, and for an additional quantity of tape equal to the difference between said predetermined quantity and said reduced quantity;

b. simultaneously accelerating said supply means and said takeup means by energizing said supply driving means and said takeup driving means, causing tape to unwind from said supply means and wind onto said takeup means with minimal tension on said tape;

c. reducing the energization of said supply driving means causing said tape to be pulled from said supply means onto said takeup means;

d. decelerating said supply means when the selected quantity of tape is wound onto said takeup means;

e. stopping said takeup means and said supply means when said additional quantity of tape is wound onto said takeup means;

f. cutting the tape after said additional quantity of tape is wound onto said takeup means; and g. ejecting said takeup means, after said tape has been cut.

6. The method defined in claim 5 further includes the steps of intermittently decelerating said supply means prior to said additional quantity of tape being wound onto said takeup means.

7. A tape winding apparatus comprising: tape supply means;

takeup means adapted to reeceive a predetermined quantity of tape from said tape supply means;

energizable means for driving said tape supply means and said takeup means, to wind tape from said tape supply means onto said takeup means;

means disposed in predetermined relationship with the path defined by the passage of tape from said supply means to said takeup means for developing a signal corresponding to the quantity of tape moved relative to said signal development means;

means for selecting a reduced quantity of tape, less than said predetermined quantity;

comparison means, coupled to both said signal development means and said selection means, for effecting a deceleration command when the quantity of tape moved relative to said signal development means equals said reduced quantity; and means, responsive to said deceleration command, for effecting the deceleration of said tape supply means after said reduced quantity of tape is moved past said signal development means.

8. The tape winding apparatus defined in claim 7 further includes second means for selecting an additional quantity of tape equal to the difference between said predetermined quantity and said reduced quantity; second comparison means coupled between said signal development means and said second selection means for effecting a stop command when the quantity of tape moved relative to said signal development means after the passage of said reduced quantity equals said additional quantity; and means, responsive to said stop command, for effecting the stoppage of said takeup means and said tape supply means.

9. The tape winding apparatus recited in claim 8 further includes means for automatically cutting said tape upon stoppage of said takeup means and said tape supply means.

10. The tape winding apparatus recited in claim 9 further includes means for automatically ejecting said takeup means upon the cutting of said tape.

11. The tape winding apparatus recited in claim 7 wherein said signal development means include: rotatable means responsive to the passage of tape between said supply means and said takeup means, having illumination means for producing light information with each revolution of said rotatable means; and photo-responsive means disposed in optical relationship with said illumination means for producing electrical information upon receipt of said light information.

12. The tape winding apparatus recited in claim 11 wherein said signal development means further include means coupled to said photo-sensitive means for producing an electrical pulse upon receipt of said electrical information; and electronic counter means for counting each of said electrical pulses.

13. The tape winding apparatus recited in claim 12 wherein said signal development means further include signal translation means, coupled between said electronic counter means and said photo-responsive means, for shaping said electrical pulses produced thereby.

14. The tape winding apparatus recited in claim 11 further includes means for edgewise guiding said tape between said rotatable means and said takeup means.

15. The tape winding apparatus recited in claim 7 further includes means, coupled to said signal development means, for producing a decelerate release command when the speed of said tape moving relative to said signal development means decreases below a predetermined rate; said deceleration release command being coupled to said means responsive to said deceleration command to prevent said deceleration command from effecting the deceleration of said tape supply means.

16. An apparatus for automatically winding a predetermined quantity of tape from a supply reel to a takeup reel comprising:

first and second energizable means adapted to respectively initially drive said supply reel and said takeup reel, to effect the winding of tape from said supply reel and onto said takeup reel;

transducer means, disposed in the path defined by the passage of tape from said supply reel to said takeup reel, for producing a train of electrical pulses having a frequency corresponding to the speed at which a determined quantity of tape is passed from said supply reel to said takeup reel;

means, coupled to said transducer means, for producing a de-energization command when the frequency of said electrical pulses exceeds a predetermined rate; and means, responsive to said de-energization command, for reducing the energization of said first drive means.

17. The apparatus recited in claim 16 further includes: counting means, coupled to said transducer means for counting said electrical pulses; means for selecting a reduced quantity of tape, less than said predetermined quantity; comparison means, coupled to both said counting means and said selection means, for producing a deceleration command when the quantity of tape moved past said transducer means equals said reduced quantity; and means, responsive to said deceleration command, for effecting the deceleration of said supply reel prior to said predetermined mined quantity of tape being wound thereon.

18. The apparatus recited in claim 17 wherein said transducer means include: rotatable means responsive to the passage of tape between said supply means and said takeup means, having illumination means for producing light information with each revolution of said rotatable means; and photo-responsive means disposed in optical relationship with said illumination means for producing electrical information upon receipt of said light information.

19. The apparatus recited in claim 17 further includes: second means for selecting an additional quantity of tape equal to the difference between said predetermined quantity and said reduced quantity; second counting means, coupled to transducer means, for counting said electrical pulses; second comparator means, coupled between said second selection means and said second counting means for effecting a stop command when the quantity of tape moved past said transducer means after the passage of said reduced quantity equals said additional quantity; and means, responsive to said stop command, for effecting the stoppage of said takeup reel and said supply reel.

20. The apparatus recited in claim 19 further includes means for automatically cutting said tape upon stoppage of said takeup means and said tape supply means.

21. The apparatus recited in claim 20 further includes means for automatically ejecting said takeup means upon cutting of said tape.

22. The apparatus recited in claim 18 further includes means for edgewise guiding said tape between said rotatable means and said takeup means.

23. The apparatus recited in claim 17 further includes means, coupled to said transducer means, for producing a decelerate release command when the speed of said tape moving past said transducer means decreases below a predetermined rate; said deceleration release command being coupled to means responsve to said deceleration command to prevent said deceleration command from effecting the deceleration of said tape supply reel.

24. An apparatus for automatically winding a predetermined quantity of tape from a supply reel to a takeup reel comprising:

energizable means for driving said supply reel and said takeup reel to wind tape from said supply reel to said takeup reel;

transducer means, disposed in the path defined by the passage of tape from said supply reel to said takeup reel, for producing a train of electrical pulses to corresponding to the speed at which a determined quantity of tape is moved past said transducer means;

first counting means coupled to said transducer means for counting said electrical pulses;

first means for selecting a reduced quantity of tape, less than said predetermined quantity;

comparator means, coupled to both said first counting means and said first selection means, for producing a deceleration command when the quantity of tape moved past said transducer means equals said reduced quantity;

means, responsive to said deceleration command, for effecting the deceleration of said supply reel prior to said predetermined quantity of tape being wound thereon;

second means for selecting an additional quantity of tape equal to the difference between said predetermined quantity and said reduced quantity;

second counting means, coupled to said first counting means and said transducer means for counting the number of said electrical pulses provided thereby after said reduced quantity of tape is moved past said transducer means;

second comparator means, coupled between said second selection means and said second counting means for effecting a stop command when the quantity of tape moved past said transducer means after the passage of said reduced quantity equals said additional quantity; and means, responsive to said stop command for effecting the stoppage of said takeup reel and said supply reel.

25. The system defined in claim 24 further includes means for automatically cutting said tape upon stoppage of said takeup reel and said supply reel.

26. The system defined in claim 25 further includes means for automatically ejecting said takeup reel upon cutting said tape.

27. The apparatus defined in claim 24 further includes means, coupled to said transducer means, for producing a decelerate release command when the speed of said tape moving past said transducer means decrease below a predetermined rate; said deceleration release command being coupled to means responsive to said deceleration command to prevent said deceleration command from effecting the deceleration of tape supply reel.

28. An apparatus for automatically winding a predetermined quantity of tape from a supply reel, driven by an energizable supply motor, past a tachometer adapted to produce a series of signals corresponding to the speed at which a determined quantity of said tape is moved past said tachometer, onto a takeup reel, driven by an energizable takeup motor, comprising:

a takeup motor circuit having a plurality of motor energization modes;

a supply motor circuit having a plurality of motor energization modes;

switching means adapted to simultaneously switch said takeup motor circuit through said motor energization modes;

run switch means, coupled to said switching means, for producing a run signal causing said switching means to switch said takeup motor circuit and said supply motor circuit to a first energization mode for simultaneously accelerating said supply reel and said takeup reel, causing tape to be moved from said supply reel, past said tachometer and onto said takeup reel;

speed logic, responsive to said signals produced by said tachometer, for producing a de-energization command when the speed of said tape moving past said tachometer exceeds a predetermined rate, said speed logic being coupled to said switching circuit for passing said de-energization command thereto, and said switching circuit, upon receipt of said de-energization command, causing said takeup motor circuit and said supply motor circuit to switch to a second energization mode reducing the energization on said supply motor;

first comparison means, responsive to said signals produced by said tachometer, and first means for selecting a reduced quantity of tape, less than said predetermined quantity, coupled to said comparison means; said first comparison means producing a decelerate command when the quantity of tape moved past said tachometer equals said reduced quantity; said decelerate command being paassed to said switching means causing said takeup motor circuit and said supply motor circuit to assume a third energization mode for decelerating said takeup reel and said supply reel; and second comparison means, responsive to said signals produced by said tachometer, and second means for selecting an additional quantity of tape, equal to the difference between said predetermined quantity and said reduced quantity; said second comparison means producing a stop command when the quantity of tape moved past said tachometer after the passage of said reduced quantity equals said additional quantity; said stop command being passed to said switching means causing said takeup motor circuit and said supply motor circuit to assume a fourth energizable mode for stoppping said takeup reel and said supply reel.

29. The apparatus recited in claim 28 wherein said speed logic further includes means for producing a decelerate release command when the speed of said tape moving past said tachometer decreases below a predetermined rate; said deceleration release command being applied to means in said supply motor circuit for preventing said supply motor circuit from effecting the deceleration of said supply motor.

30. The apparatus recited in claim 28 further includes a tachometer drive motor for driving said tachometer, and a tachometer motor circuit having a plurality of motor energization modes; said switching meaans being adapted to switch said tachometer motor circuit to one of said modes for energizing said tachometer motor upon production of said run signal.

31. The apparatus recited in claim 30 further includes conductor means coupling said supply motor circuit to said tachometer motor circuit so that the other energization modes thereof correspond to the energization modes of said supply motor circuit; said switching means being adapted to switch said tachometer motor circuit simultaneously with said supply motor circuit, whereby the energization of said tachometer motor corresponds to the energization of said supply motor.

32. The apparatus recited in claim 28 further includes an actuating circuit having means for effecting the mechanical braking of said supply reel; said switching means being adapted to switch said actuating circuit to said means effecting mechanical braking, upon production of said stop command.

33. The apparatus recited in claim 32 wherein said actuating circuit further includes means effecting the cutting of said tape; said switching means being adapted to switch said actuating circut to said means for effecting the cutting of said tape a predetermined time after the production of said stop command.

34. The apparatus recited in claim 33 wherein said actuating circuit further includes means for effecting the disengagement of said takeup motor from said takeup reel; said switching means being adapted to switch said actuating circuit to said means for effecting the disengagement of said takeup motor from said takeup reel a predetermined time after said tape is cut.

35. The apparatus recited in claim 34 wherein said actuating circuit further includes means for ejecting said takeup reel; and delay means having a predetermined delay, coupled between said means for effecting the disengagement of said takeup motor from said takeup reel and said means for ejecting said tape, whereby said means for ejecting said tape are actuated after said predetermined delay.

* * * * *